United States Patent [19]
Park

[11] Patent Number: 4,655,244
[45] Date of Patent: Apr. 7, 1987

[54] FLOAT OPERATED VALVE

[76] Inventor: Soo H. Park, 3-557, Mia-Dong, Dobong-ku, Seoul, Rep. of Korea

[21] Appl. No.: 807,267

[22] Filed: Dec. 10, 1985

[30] Foreign Application Priority Data

Dec. 12, 1984 [KR] Rep. of Korea ............... 13049/1984

[51] Int. Cl.<sup>4</sup> ..................... F16K 31/26; F16K 31/28; F16K 31/08
[52] U.S. Cl. .................................. 137/412; 137/416; 137/423; 137/426; 137/436; 137/443; 137/449; 251/65
[58] Field of Search ............... 137/412, 416, 420, 421, 137/423, 426, 434, 442, 443, 445, 449, 435, 436; 251/65

[56] References Cited

U.S. PATENT DOCUMENTS

| 700,316 | 5/1902 | Flagg | 137/416 |
| 1,558,178 | 10/1925 | Jung | 137/416 |
| 1,770,909 | 7/1930 | Brooks | 137/436 |
| 2,013,188 | 9/1935 | Reinhardt | 137/416 |
| 2,738,947 | 3/1956 | Hjulian | 137/416 |
| 2,780,239 | 2/1957 | Hjulian | 137/416 |
| 2,835,270 | 5/1958 | York et al. | 137/412 |
| 2,963,037 | 12/1960 | Woodward | 137/416 |
| 3,040,769 | 6/1962 | Lamb | 137/423 |
| 3,055,387 | 9/1962 | Eagar | 137/416 |
| 3,400,733 | 9/1968 | Scoppola | 137/416 |

FOREIGN PATENT DOCUMENTS

| 413831 | 6/1946 | Italy | 137/423 |
| 922956 | 4/1963 | United Kingdom | 137/416 |

Primary Examiner—George L. Walton
Attorney, Agent, or Firm—Seed and Berry

[57] ABSTRACT

A float operated valve is provided with the rise of a float being temporarily prevented by the elastic force of a spring mounted on the valve body. When the buoyant force of the float reaches a predetermined maximum buoyant force as a result of the water level rising and the float becoming increasingly submerged, the buoyant force of the float moves the spring and closes the valve. The valve is also shown with a twin float construction for on/off operation at low and high water levels.

13 Claims, 21 Drawing Figures

FLOAT OPERATED VALVE

DESCRIPTION

1. Technical Field

The present invention relates generally to float operated valves.

2. Background of the Invention

In the conventional float operated valve, the float lifts with the rising water level in the water tank, and the lever secured to the float shuts off the nozzle by moving the valve seat upwardly. As such, the inflow of water is cut off on reaching the desired water level.

Accordingly, in such a conventional float operated valve, the weight and buoyant force of the float are in a delicately balanced equilibrium state as the float applies the pressing force or closing force of the valve, that is, the force supporting the valve seat upwardly against the nozzle. In such condition, the valve seat is supported upwardly by less than sufficient force and shut off the water flow is unstable.

Figure 1:
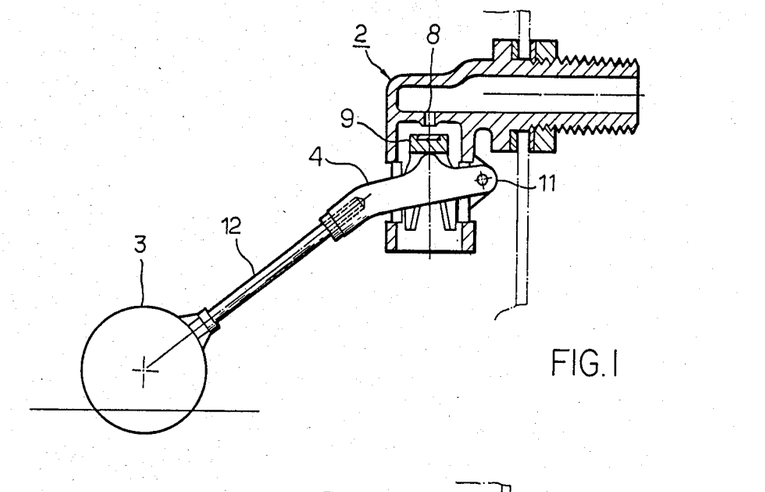
FIG. 1 is a sectional view of a conventional float operated valve.

In order to overcome the above-described drawbacks, as illustrated by the conventional float operated valve shown in FIG. 1, the orifice of the nozzle 8 is formed as small as possible and the outer circumferential contact portion of the nozzle 8 is provided with an acute angle. The valve seat is made of soft rubber materials and the float 3 is formed as large as possible. The length of the lever is also made very long.

The convention float operated valve using a rubber type valve seat has the disadvantage of not being usable in high temperature and high pressure systems. Also, such a valve seat cannot be used with corrosive liquids. If a small diameter for the nozzle is used, inflow time is prolonged and inflow noise is produced.

As stated above, the conventional float operated valve has severe drawbacks and the basic principle of their design have undergone little change. Accordingly, the wide usage of the float operated valve has been limited due to the instability of the operation on the float operated valve, by the valve seat materials used, by the limitation of uses relating to the fluid temperature/pressure, by the return of water to level taking a long time and by the production of noise.

DISCLOSURE OF THE INVENTION

It is the purpose of this invention to provide a valve structure which when actuated applies improved closing force. The rise of the float as a result of rising up of the water level is prevented until the buoyant force approaches a maximum buoyant force. The float is then released and at the same time rises speedily. The float operated valve is allowed to be closed at about the half-swamped point of all buoyant force of the float on the full rising stroke up to the point which the buoyant force and weight of the float in itself are in equilibrium state. The valve seat may be manufactured of various metal materials, the rapid return of the water level is provided and at the same time the use range of the valve is widely extended for use with high temperature, high pressure and corrosive liquids.

The present invention resides in a float operated valve. The valve includes a valve body, a valve operable to restrict the flow of fluid therethrough, and a float responsive to liquid level. The valve further includes an engagement member connected to the float for movement therewith and pivotally attached to the valve body. The engagement member is moved into operative engagement with the valve in response to the float rising.

A resilient member is positioned to engage the engagement member as the float rises and applies sufficient elastic force to the member to temporarily prevent movement of the engagement member into operative engagement with the valve. The resilient member releases the engagement member upon the float exerting a buoyant force on the resilient member exceeding a predetermined buoyant force. At such time, the engagement member is permitted substantially uninhibited movement in response to the float so as to move into operative engagement with the valve. The predetermined buoyant force is set at a force which exceeds the unrestricted buoyant force of the float in order to hold the valve in a closed state with greater force than could be exerted by the unrestricted force of the float used in conventional float operated valves.

The engagement member includes a lever with an upwardly projecting element. In one embodiment, the resilient member is a spring rigidly attached to the valve body. The spring has a lower free end positioned to engage the level and apply the elastic force thereto. The resilient member can include a roller, and the engagement member can include a smooth roller surface against which the roller applies the elastic force.

The valve can further include a switch rod connected to the engagement member and connectable to a power source for automatic control of the valve.

In another embodiment of the invention, the engagement member includes a lower surface and a side surface. A lock arm is pivotally attached to the valve body and connected to a second float for movement therewith. The lock arm supports a roller engageable with the lower engagement surface to hold the engagement member locked in position to maintain the valve closed until the second float is lowered to a predetermined low liquid level. At such time, the roller disengages from the lower surface and the engagement member allows opening of the valve. When disengaged, the lock arm roller is positioned to engage the side engagement surface and thereby is prevented from returning to engagement with the lower engagement surface as the second float is raised in response to the liquid level rising. When the liquid level rises sufficiently for the main float and the resilient member to operate to close the valve as described above, the second float moves the roller again into engagement with the lower engagement surface and locks the valve closed.

In an alternative embodiment of the invention the elastic force is applied by an arrangement using a permanent magnet and iron piece. The valve is further provided with an in-flow passage relief valve. An adjustable control nut is provided for angular adjustment of the float rod to which the second float is connected for setting the lower liquid level at which the second float disengages the lock arm from the lower engagement surface.

Other features and advantages of the invention will become apparent from the following detailed description, taken in conjunction with the accompanying drawings.

BRIEF DESCRIPTION OF THE DRAWINGS

FIGS. 5(a), (b) and (c) are views illustrating the operating conditions according to the present invention.

FIGS. 11(a), (b), (c), (d), (e) and (f) are views illustrating the operational states of the embodiment of FIG. 10.

FIGS. 12(a), (b) and (c) are sectional views of one embodiment of the float operated valve using a relief valve to avoid water hammer, in which

BEST MODE FOR CARRYING OUT THE INVENTION

To facilitate a better understanding of the float operated valve of the present invention, those portions of the floating valve illustrated in FIG. 2 to FIG. 6 will be described.

Reference numeral 1 is a pushing spring secured with a spring holder 6 on a valve body 2. The lower end portion of the pushing spring 1 is pressed against an arms knob 5 of a lever 4. Secured to the lever is a rod 12 which has an end portion fixedly attached to a float 3. As will be described in more detail below, the pushing spring 1 temporarily prevents the rise of the float.

Figure 2:
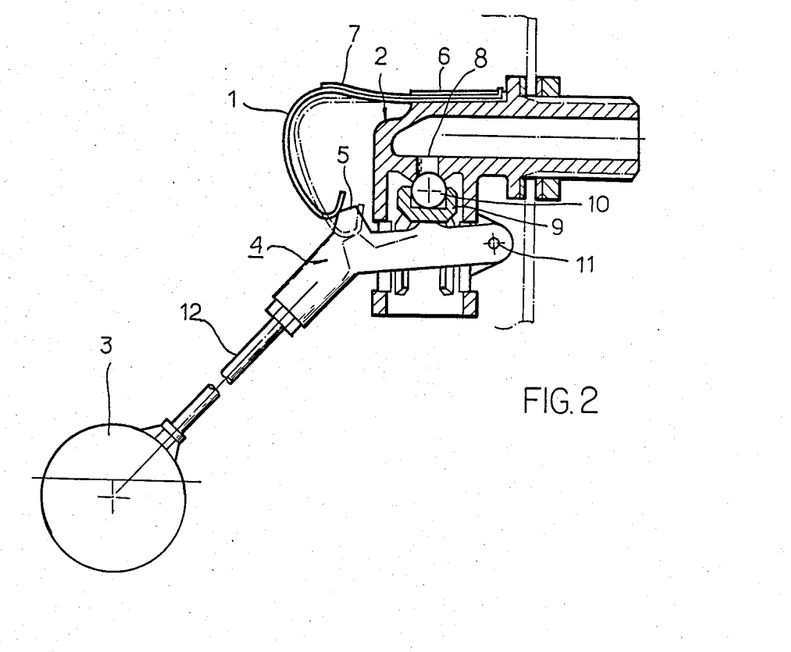
FIG. 2 is a sectional view of one of a float operated valve embodiment according to the present invention.

On the upper surface of the pushing spring 1, is attached an auxiliary spring 7 to provide supplementary spring strength. Reference numeral 8 is a nozzle formed on the valve body 2. As shown in FIG. 2, reference numeral 9 is a metallic valve disk, and reference 10 is a ball. Reference numeral 11 is a pivot pin for the lever 4 pivotably disposes on one side of the valve body 2.

Figure 3:
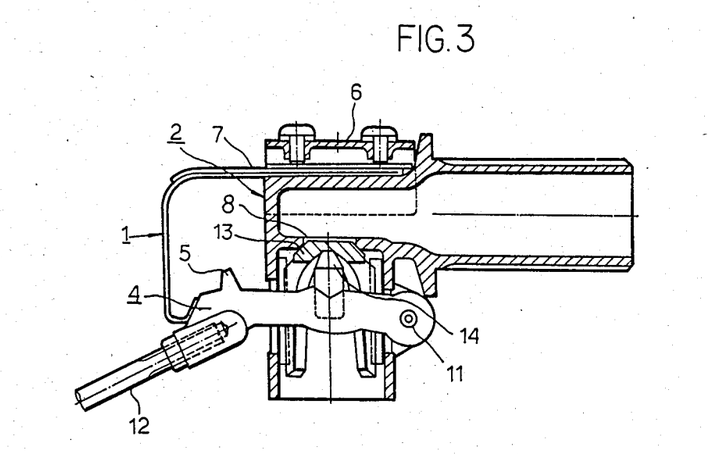
FIG. 3 is a sectional view of another embodiment according to the present invention.

As shown in FIG. 3, reference 13 is a metal valve seat. The metal valve seat 13 is interconnected with the lever 4 by a pushing piece 14.

In the present invention formed as above, as the water level gradually rises by water flowing into the water tank, the float 3 has a tendency to rise. At such time when sufficient water enters the tank, the upper face of the arms knob 5 of the lever 4, which is linked with the float 3 through the rod 12, is pressed into engagement with the lower end portion of the pushing spring 1. Accordingly, the float 3 will be prevented from rising further and is held in place as the water level rises. As such, the float begins to gradually submerge as the water level rises, and the buoyant force of the float increases continuously as the water rises.

Figure 4:
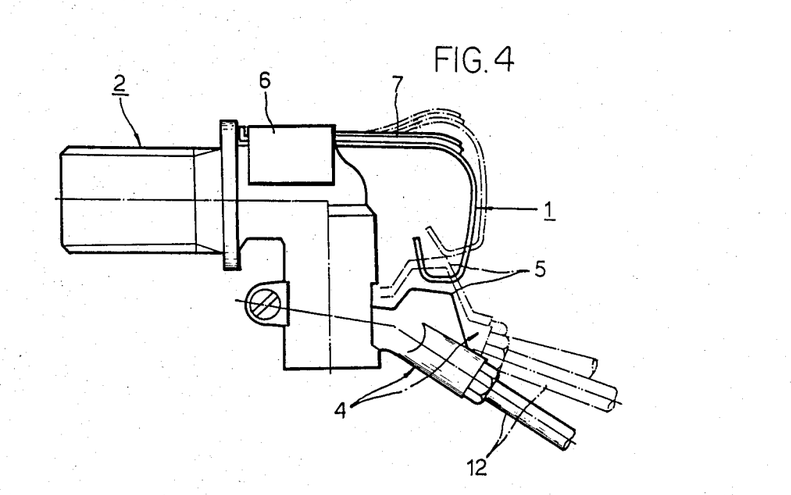
FIG. 4 is a side view of a valve such as shown in FIGS. 2 and 3 showing operational conditions according to the present invention.
Figures 5A, 5B, 5C:
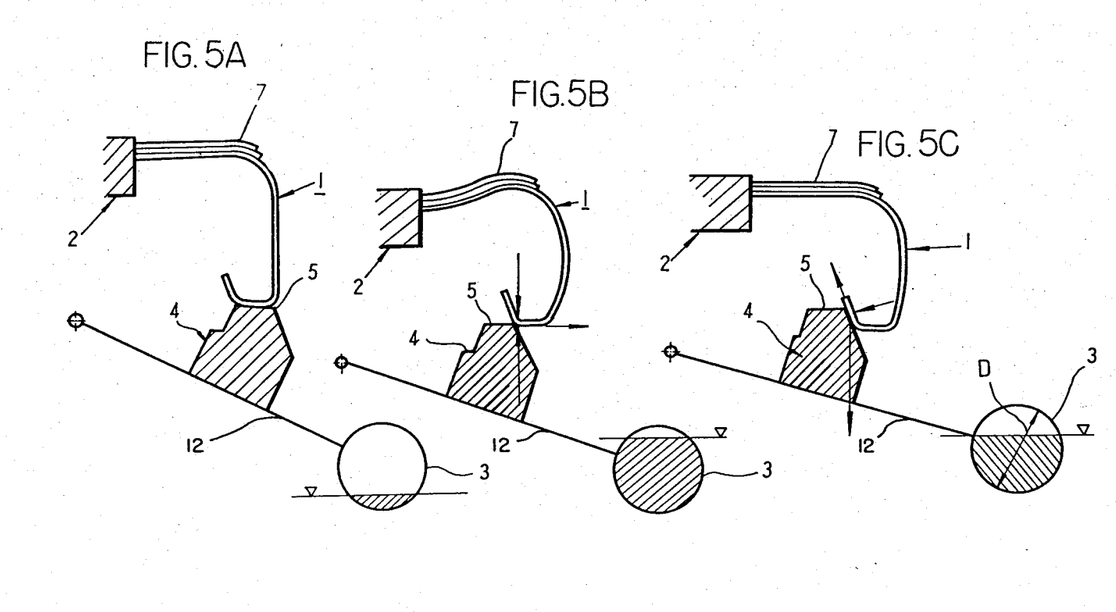

As a result of its increasing buoyant force, the float 3 will eventually overcome the downwardly directed force of the pushing spring 1, and as shown in FIG. 4 and the sequence of FIGS. 5(a), (b) and (c), the spring is pushed by the pressing force of the arms knob 5 outwardly in the lateral direction. Accordingly, on the approach of the maximum buoyant force of the float 3 (that is, when the float is swamped by about 4/5 part in height thereof) the pushing spring 1 is moved laterally enough to remove it from engagement with the upper end portion of the arms knob 5. At such time the pushing spring is prevented from inhibiting further upward travel of the float. At the moment the pushing spring is disengaged from the arms knob, the partially submerged float 3 is allowed to abruptly rise upward.

In FIG. 2, one portion of the lever 4 supports from below the metallic valve disk 9 and when the float rises and is in the state with about 3/5 part to ½ part in height of the float 3 swamped in water, the valve is held tightly closed. When floated in water unrestricted except by the weight of the float 3, the float is swamped in water by about 1/5 in height of the float. The ball 10 in FIG. 2 and the metallic seat 13 in FIG. 3 are allowed to tightly close the nozzle 8, by the position in which the metallic sheet 13 or the ball 10 is placed.

Accordingly, in the condition with the float 3 no longer prevented from rising upwardly by the pushing spring 1 and floating only against the weight of the float (that is, in the condition with about 1/5 in height of the float swamped in water), the difference of the buoyant force (for example, buoyant force on volume corresponding to about 2/5 in height of diameter of the float) is allowed to provide the upwardly pressing force on the ball 10 or the metallic seat 13. This provides the closing and pressing force of the valve.

By such manner, change of the closing force of the valve or change of the valve lift may be easily made by controlling the resiliency of the pushing spring 1, size of the float 3, and changing of the distance ratio between the pivot pin 11 and end portion of the lever 4.

As one example, the float 3 with ball shape will be described in greater detail.

As indicated in FIG. 5(c) of the drawings, reference letter "D" indicates the diameter of the float 3. A maximum of about a 4/5 portion of the diameter (height) of the float 3 is held underwater by the pushing spring 1 when in position to prevent the rise of the float 3 against the force of the upwardly rising water level in the water tank (see FIG. 5(b)). Thereafter, when the pushing spring is disengaged, the force applied by the pushing spring to prevent rise of the float is speedily removed and the float is permitted to rise somewhat.

At this time, after the float has swiftly risen by only 1/5×D of the float, to a position with the float still about 3/5×D submerged, the metallic valve seat 13 or the ball 10 is placed in seated arrangement with the nozzle 8 to tightly close the valve. The valve is held tightly closed, by a force greater than provided by conventional valves, by the upward buoyant force the float applies through the rod 12 and the lever 4 on the valve seat or ball.

Figure 6:
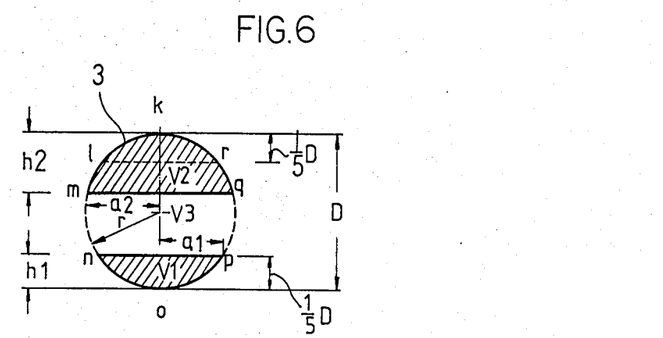
FIG. 6 is a view illustrating the float operational conditions according to the pushing spring of the present invention.

Once the valve is closed, the float 3 cannot rise further, hence the buoyant force of the float which supplies the valve closing force, corresponds to the force created by the volume surrounding points m, n, p and q as shown in FIG. 6. The float is shown in FIG. 5(c) in position with the valve closed. The buoyant force of the float is multiplied by the length of the lever 4 to supply the actual closing force on the valve. By the valve being placed in the closed state when the float is 3/5 submerged rather than when only 1/5 submerged, as the float is when in its unrestricted state used in conventional float operated valves, a larger than normal closing force is created.

Accordingly, with the present invention it is no longer necessary to use only a valve seat material such as soft rubber shown in the prior art and the valve may use a valve seat and valve disk/ball of metal.

As described above, the functional principle of the invention will be described by the next equation.

When reference letter "V" is volume of the spherical float 3 (see FIG. 5 and FIG. 6), $$V = \frac{4\pi}{3} r^3.$$

When reference letter "$V_1$" is the volume that subtracts weight of the spherical float, namely, the volume of the portion surrounding points r, k, l and r or points n, o, p and n as shown in FIG. 6, $$V_1 = \frac{\pi}{6} h_1 (3a_1^2 + h_1^2) = 0.05447 D^3.$$

When reference letter "$V_2$" is the volume that subtracts weight of the spherical float, namely, the volume of the portion surrounding points K, l, m, q, r and k as shown in FIG. 6, $$V_2 = \frac{\pi}{3} (h_2)^2(3r - h_2) = 0.18431 D^3.$$

When reference letter "$V_3$" is the volume of the portion surrounding points, m, n, p, q and m shown in FIG. 6, $$V_3 = V - (V_1 + V_2) = 0.28482 D^3.$$

Accordingly, when the reference letter "$V_3$" is the net volume producing the buoyant force to be applied as the closing force of the valve, the reference letter "V" is volume of the float 3 and the reference letter "r" is their ratio, the ratio (r) between the net volume $V_3$ and volume V is as in the following equation.

$$r = \frac{V_3}{V} = \frac{0.28482 D^3}{0.5236 D^3} \times 100\%$$

$$r = 54.4\%.$$

Namely, when the volume of about 54.4% of the volume for the float 3 is applied, the huge force, which is multiplied the volume by the ratio h as ratio of specific gravity for liquid and length of the lever, may be applied as the closing force of the valve.

Figure 7:
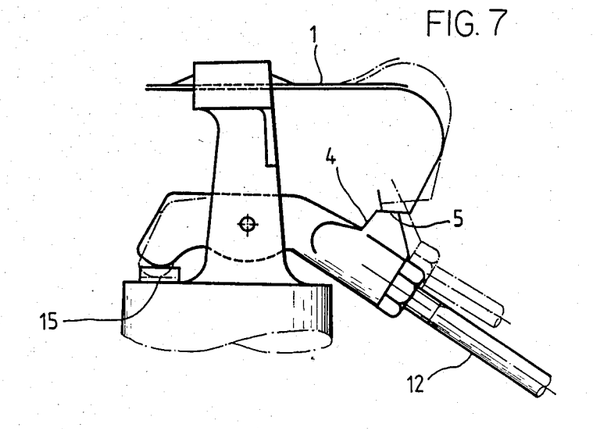
FIG. 7 is a side view of another embodiment according to the present invention.
Figure 8:
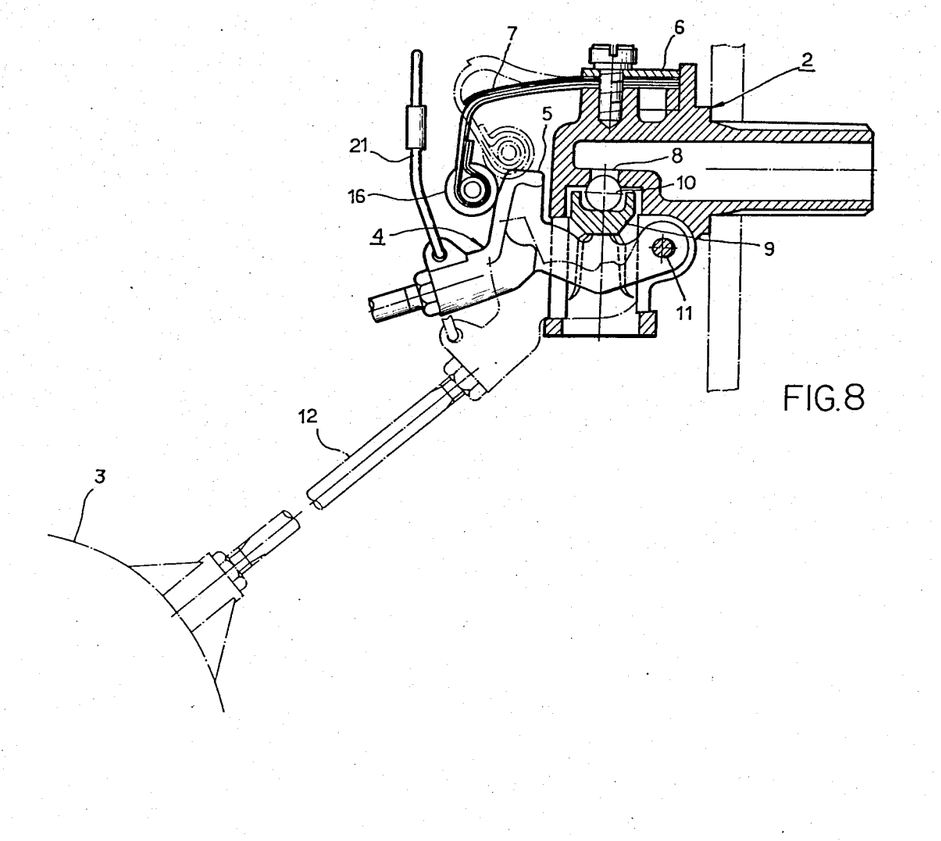
FIGS. 8 and 9 are sectional views of two other embodiments according to the present invention.

Further, as shown in the embodiment of FIG. 7, a valve bottom 15 may be downwardly pressed. As shown in FIG. 8, a roller 16 may be fixed on the lower end portion of the pushing spring 1 to engage the arms knob 5.

Figure 9:
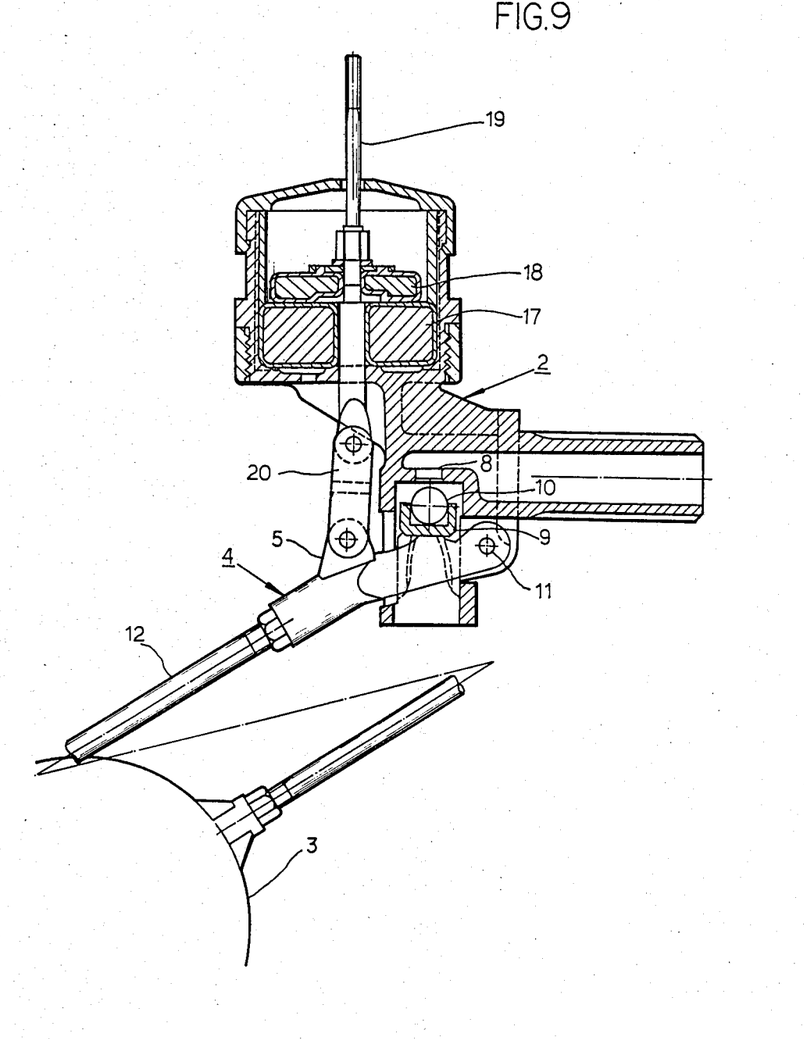

As shown in FIG. 9, in substitute for the pushing spring 1, the same effects will be produced by using a permanent magnet 17, an iron piece 18, an actuating rod 19 and a connecting piece 20.

Figure 10:
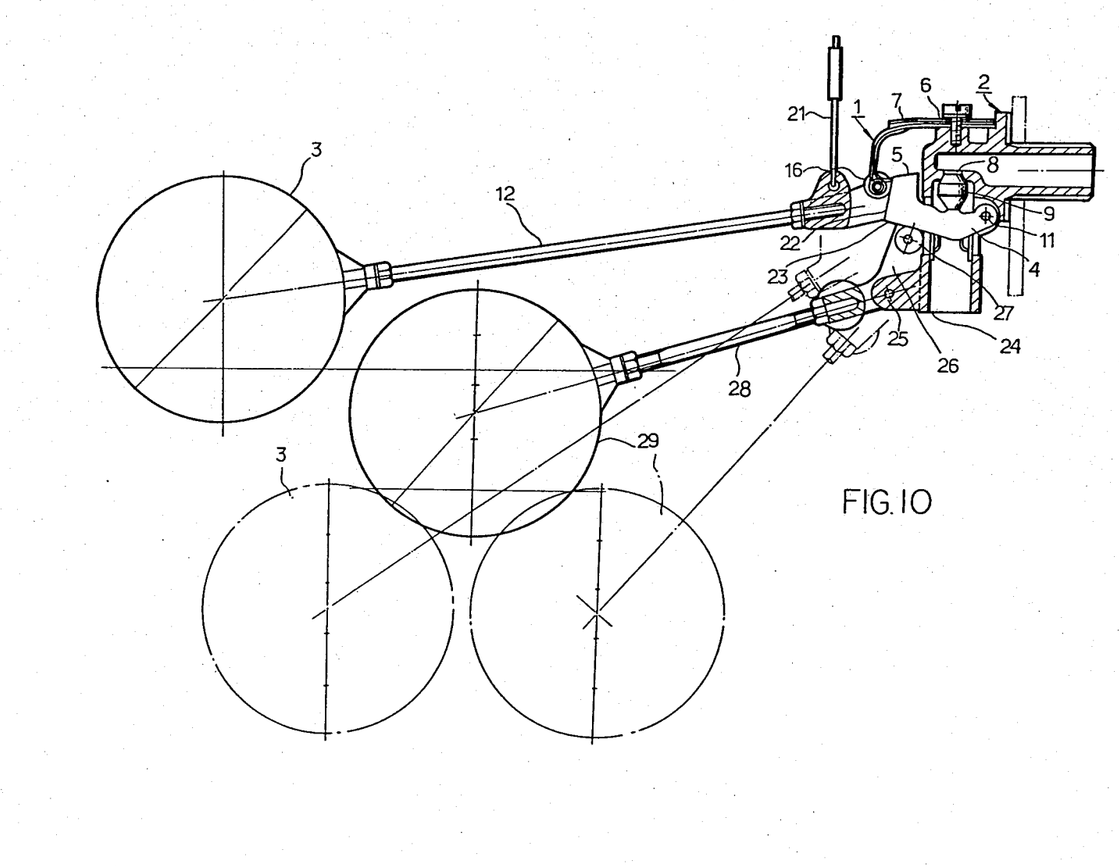
FIG. 10 is a section view of still another embodiment according to the present invention using dual floats.

An alternative embodiment of the valve, designed for upper limit level and lower limit level action is shown in FIG. 10 with clear demarcation therebetween. The valve provides automatic opening at a low water level, and automatic closing at a high water level. It has a switching rod 21 disposed on the lever 4. The switching rod 21 can be directly operated by the pump-driving switch (or the power source for automatic control) linking to the piping system, solenoid valve and so forth, without a relay devices (not shown). Accordingly, the automatic control systems may be simply provided.

As will be described in more detail below for the dual float embodiments of FIGS. 10 and 11, during water inflow into the water tank, the valve is entirely open and the return of the water level within the water tank is rapid. Accordingly, an entire opening and entire closing function of the nozzle is performed, and the invention will produce reduced noise of the inflow.

FIG. 10 and FIG. 11 show a float operated valve capable of controlling water level, which is formed by principles of the invention. In this embodiment, the valve is provided with a few added parts. The valve functions to completely close and completely open, almost instantaneously, and does so only at the upper water limit level and the lower water limit level, respectively. The upper and lower limit levels for the water may be controlled as desired by selecting the opening and closing operational positions of the valve. The above described valve structure is described in greater detail below.

The lever 4 has a curved roller surface 22 on the side thereof formed in a circular arc centering around the pivot pin 11, and a roller curved surface 23 on the lower surface thereof formed in a circular arc centering around a pivot pin 25 connected to a fixed piece 24 of the valve body 2. The side and lower roller surfaces 22 and 23 are formed, respectively, for timely and tightly rolling engagement by the roller 16 of the pushing spring 1 and a roller 27 disposed on the leading end of a locker arm 26.

The locker arm 26 is pivotally attached to the valve body by the shaft 25. On the lower end portion of the locker arm 26 a rod 28 is secured, and on the end portion of the rod 28 is fixably attached a float 29. The sequence of FIGS. 11(a), (b), (c), (d), (e), (f) illustrate the operation of the valve.

Figures 11A, 11B:
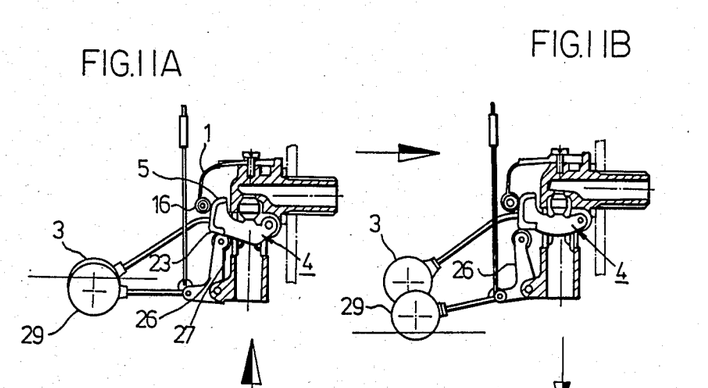

In FIG. 11(a) the roller 16 attached to the pushing spring 1 is removed from the surface of the arms knob 5 on the lever 4, and because the float 3 is more than half swamped in water, the excess buoyant force as described above is applied on the valve disk and the valve is tightly closed. The lower surface 23 of the lever 4 is supported in its raised position with the valve closed by the roller 27 of the locker arm 26.

In FIG. 11(b) the water level in the water tank is shown lowered downward, but the float 3 is left as it is, and the valve is maintained in the closed state because the rocker arm 26 continues to upwardly support the lever 4 until the water level in the water tank reaches a lower limit level.

Figures 11C, 11D, 11E, 11F:
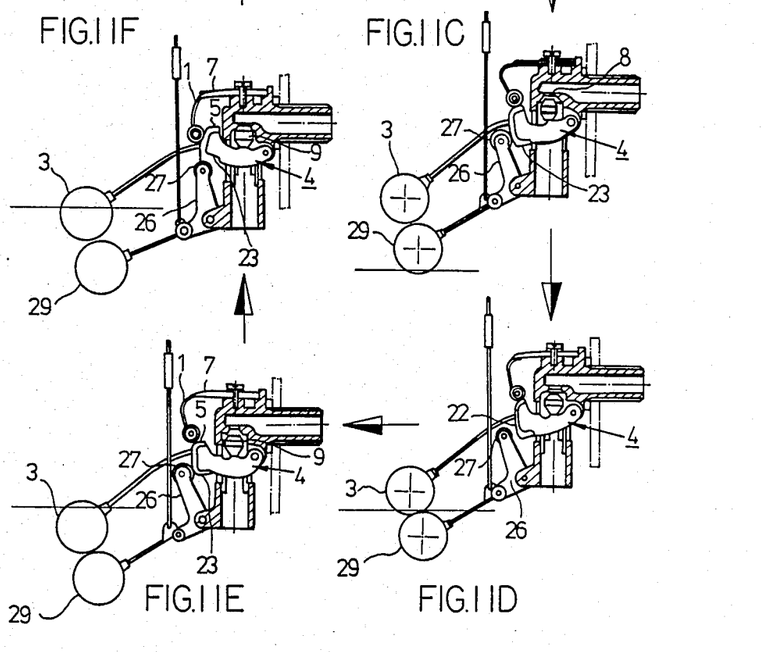

In FIG. 11(c) the water level is shown lowered to the lower limit level, and the float 29 has been lowered by the weight of the float 29. At the same time the roller 27 is removed from the lower surface 23 of the lever 4 in the lateral direction. Because the float 3 also is then lowered, by its reception of the water pressure from the nozzle 8 and the weight of the float 3, the pushing spring 1 is returned to a position engaging the upper face of the arms knob 5 by the spring elasticity. Because the nozzle of the valve is in the fully open state, the supplying water flows into the water tank and the water level in the water tank is allowed to be speedily returned to its original state.

In FIG. 11(d) the nozzle is shown in the open state and the supplying water is flowing into the water tank;

that is, the water level is raising and a buoyant force is produced on the float 29. Although the float 29 will rise somewhat again, the roller 27 is inhibited by the side curved surface 22 of the lever 4 and the float 29 cannot rise fully and becomes increasingly swamped in the water. The water level rises continuously and at the time when the water level reaches the float 3, a buoyant force is again produced on the float 3.

In FIG. 11(e), although the water level is substantially increased and the float 3 rises upwardly, the upward travel of the float 3 is prevented by the pushing spring 1 in the manner described above. The float 3 is freed for further upward travel when the float 3 approaches its maximum buoyant force as shown in FIG. 11(f), and the force exerted on the pushing spring 1 is sufficient to move it laterally from the upper face of the arms knob 5. This force is determined by the elasticity of the pushing spring 1 and the auxiliary spring 7.

The float 3 then speedily rises and carries the valve disk upwardly to close the valve and terminate the flow of water as described above at the upper limit level. When the flow of water is closed, the lever 4 is raised sufficiently to permit the roller 27 of the locker arm 26 to roll laterally on the lower surface 23 and allow the float 29 to rise (the float 29 being previously held swamped in water under the maximum buoyant force). The strong buoyant force of the float 29 is applied to the lower curved surface 23 of the lever 4 as shown in FIG. 11(a) to assist in holding the valve closed.

Figures 12A, 12B, 12C:
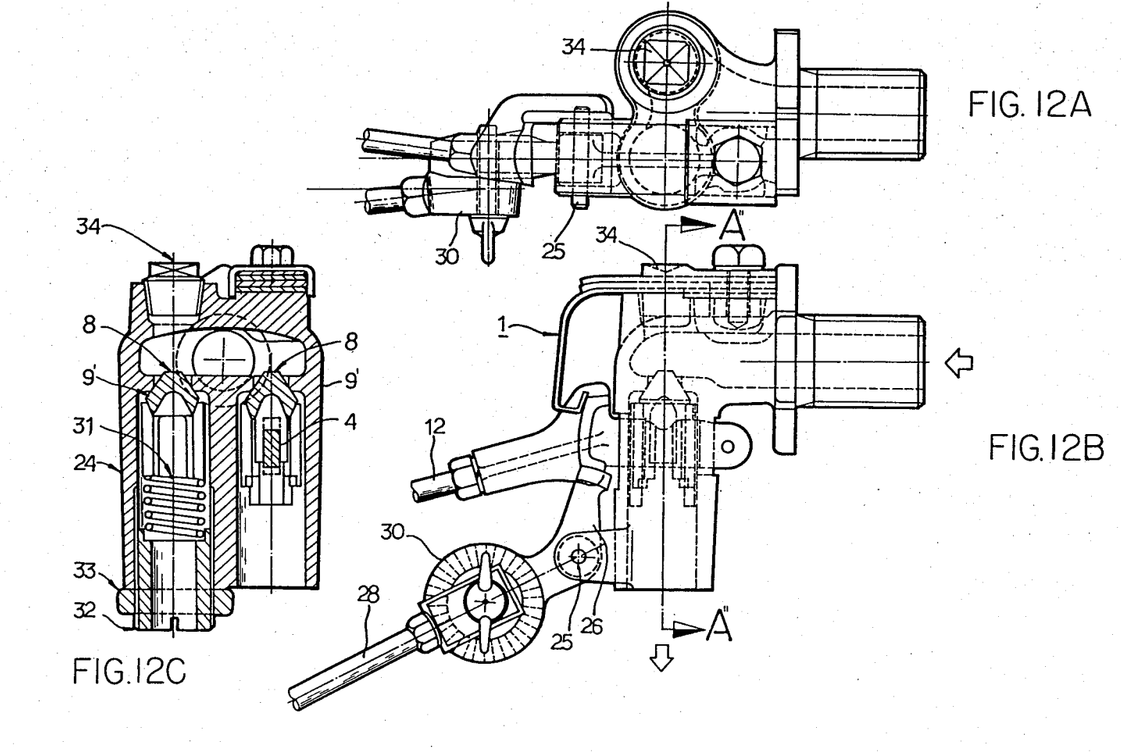
FIG. 12(a) is a plan view.
FIG. 12(b) is a side view.
FIG. 12(c) is shown a sectional view taken substantially along line A"—A" of FIG. 12(a).

As shown in FIG. 12, a control nut 30 is provided to control the angle of the rod 28, and hence the lower limit level of the water in the water tank.

As described above in greater detail, the present invention uses the maximum buoyant force of the float 3 by mounting the pushing spring 1 on the valve body 2 and pressing the arms knob 5 of the lever 4 against the lower end of the pushing spring until the float is subjected to increased buoyant force sufficient to produce a closing force for a positive shutoff and leakage proof seal. The increased closing force is created by the valve operation action itself and not by use of a device biasing the valve disk into seated arrangement with the nozzle.

Further, according to the present invention, when the predetermined buoyant force of the float 3 is produced the lever 4 is raised almost instantaneously and the valve is closed. As such, the turnoff time is very quick and produces little noise. When the valve is closed, the invention provides improved closing force on the valve disk because the valve is closed with the float in the swamped state of 3/5 to ½ height o the diameter of the float 3 applied through the lever 4 (1/5 height on the diameter of the float 3).

The invention has smooth operation by the smooth contact provided by mounting the roller 16 on the leading end of the pushing spring 1. The same effect is achieved by utilizing magnetic attraction in place of the pushing spring 1.

The invention has sufficient buoyant force, which is obtainable simply to provide the automatic control systems, without a separate relay device, by the connection of the driving pump switch directly connected to the piping system through the switching rod 21 for operation or to the solenoid pump and the like.

In particular, by utilizing the principle of the invention, a double float valve, which is able to control the high and low water levels, can be provided. Also, by even the simpler construction of the invention, the valve can be provided with rapid closing time and sufficient closing force.

Further, the invention can provide speedy return of the water level, can inhibit noise and is useful for high temperature, high pressure and corrosive environments.

The interior passages of the valve are freed from water hammering by the speedy closure of the above described valve through use of a relief valve 9'. As shown in FIG. 12, the relief valve 9' can be incorporated into the valve body. The valve 9' is supported by the coil spring 31 for pressure control of the inflow passage. A pressure control nut of bushing 32 is provided for pressure control of the outflow. When the valve 9' is tightly fixed by the locking nut 33, the invention can be provided with a variety of valves, which can be protected against water hammering and the like. Reference numeral 8' is a nozzle.

The novel float operated valve of the present invention is easily and inexpensively machined and readily assembled. Moreover, the valve may be used in the field of services in tanks, reservoirs, air conditioning devices and the like.

While the present invention has been described with reference to specific embodiments thereof, it will be understood that numerous modifications may be made by those skilled in the art without actually departing from the scope of the claimed invention.

Accordingly, all modification and equivalents may be resorted to which fall within the scope of the invention as claimed.

I claim:

1. A float operated valve, comprising:

a valve body;

a valve operable to restrict the flow of fluid therethrough;

a float responsive to liquid level;

an engagement member connected to said float for movement therewith and pivotally attached to said valve body, said engagement member being moved into operative engagement with said valve in response to said float rising, said engagement member having an outwardly projecting engagement portion; and a resilient member attached to said valve body, said relient member being separate from said engagement member and positioned to directly disengagably engage said engagement portion as said float rises and apply a sufficient elastic force to said engagement portion to temporarily prevent the movement of said engagement member into operative engagement with said valve, said resilient member disengaging from said engagement portion to release said engagement member for substantially uninhibited movement in response to the buoyant force of said float to permit operative engagement with said valve upon said float exerting a buoyant force on said resilient member directly through said engagement portion which exceeds a predetermined buoyant force, said predetermined buoyant force exceeding the unrestricted buoyant force of said float to thereby hold said valve in a closed state with greater force than the unrestricted force exertable by said float.

2. The float operated valve of claim 1 wherein said engagement portion includes a lever with an upwardly projecting element, and said resilient member is a spring rigidly attached to said valve body and having a lower free end positioned to engage said lever element and apply said elastic force thereto.

3. The float operated valve of claim 1 wherein said resilient portion includes a roller, and said engagement portion includes a smooth roller surface against which said roller applies said elastic force.

4. The float operated valve of claim 1 further including a switch rod connected to said engagement member and connectable to a power source for automatic control of the valve by applying an external force exceeding said predetermined buoyant force to said engagement member to selectively overcome said elastic force.

5. The float operated valve of claim 1 wherein said engagement member includes a lower surface and a side surface, and further includes a lock arm pivotally attached to said valve body and connected to a second float for movement therewith, said lock arm supporting a roller engageable with said lower engagement surface to hold said engagement member locked in a position to maintain said valve closed until said second float is lowered to a predetermined lower liquid level and disengages said roller from said lower surface, whereupon said engagement member allows opening of said valve, when disengaged said lock arm roller is positioned to engage said side engagement surface which is positioned to prevent said lock arm roller from returning to engagement with said lower engagement surface and applying a closing force thereto as said second float is raised in response to the liquid level rising, upon the liquid level reaching a predetermined upper liquid level at which said main float applies said buoyant force on said resilient member exceeding said predetermined buoyant force to close said valve, said side engagement surface is positioned to allow said lock arm roller to again engage said lower engagement surface under the buoyant force of said second float.

6. The float operated valve of claim 5 wherein the second float includes a float rod connected to an adjustable control nut for adjustment of the angle of said float rod to set said lower liquid level at which said second float disengages said lock arm from said lower engagement surface.

7. The float operated valve of claim 1 wherein said valve body includes a relief valve mounted in a liquid inflow passage, said relief valve including a valve closure member resiliently biased into engagement with a valve seat by a resilient member for control of said inflow passage pressure to prevent water hammering.

8. A float operated valve, comprising:
a valve body;
a valve operable to restrict the flow of fluid therethrough;
a float mounted on a float arm and being responsive to liquid level;
a rigid engagement member connected to said float through said float arm for movement therewith and pivotally attached to said valve body, said engagement member being moved into operative engagement with said valve in response to said float rising, said engagement member having an engagement surface portion; and
resilient means separate from said engagement member for directly disengagably engaging said engagement portion as said float rises and applying a sufficient elastic force to said engagement portion to temporarily prevent the movement of said engagement member into operative engagement with said valve, said resilient means disengaging from said engagement portion and releasing said engagement member for substantially uninhibited movement in response to the buoyant force of said float to permit operative engagement with said valve upon said float exerting a buoyant force on said resilient means directly through said engagement portion which exceeds a predetermined buoyant force, said predetermined buoyant force exceeding the unrestricted buoyant force of said float to thereby hold said valve in a closed state with greater force than the unrestricted force exertable by said float.

9. The float operated valve of claim 8 wherein said engagement member includes a lower surface and a side surface, and further includes a lock arm pivotally attached to said valve body and connected to a second float for movement therewith, said lock arm having lock means for contact with said lower engagement surface to hold said engagement member locked in a position to maintain said valve closed until said second float is lowered to a predetermined lower liquid level and disengages said lock means from said lower surface, whereupon said engagement member allows opening of said valve, when disengaged said lock means being in contact with said side engagement surface, said side engagement surface being positioned to prevent said lock means from returning into contact with said lower engagement surface and applying a closing force thereto as said second float is raised in response to the liquid level rising, upon the liquid level reaching a predetermined upper liquid level at which said main float applies said buoyant force on said resilient means exceeding said predetermined buoyant force to close said valve, said side engagement surface is positioned to allow said lock means to again contact said lower engagement surface under the buoyant force of said second float.

10. A float operated valve, comprising:
a valve body;
a valve operable to restrict the flow of fluid therethrough;
a float responsive to liquid level;
a rigid float arm being connected to said float for movement therewith and pivotally attached to said valve body, said float arm having engagement means for movement into operative engagement with said valve in response to said float rising; and
release means for applying a releasable force on said float arm as said float rises to prevent the movement of said engagement means into operative engagement with said valve until said float exerts a buoyant force on said release means which exceeds said releasable force, said release means including a coacting member and a release member, one of said release or coacting members being mounted on said valve body and the other of said release or coacting members being mounted on said float arm, whereupon said release member releases said coacting member from direct engagement with one another for substantially uninhibited movement of said engagement means in response to the buoyant force of said float to permit said engagement means to operatively engage with said valve, said releasable force exceeding the unrestricted buoyant force of said float to thereby hold said valve in a closed state with a greater force than the unrestricted force exertable by said float.

11. The float operated valve of claim 10 wherein said release means includes a magnetic member.

12. The float operated valve of claim 10 wherein one of said release or coacting members includes a permanent magnet and the other includes an iron piece, one of said permanent magnet or said iron piece being mounted on said valve body and the other being mounted on said float arm with an actuating rod operating therewith and interconnected with one of said permanent magnet or said iron piece to apply said releasable force to said float arm.

13. The float operated valve of claim 12 further including a second float and lock means responsive to said second float for maintaining said valve in a close state until said second float is lowered to a predetermined lower liquid level, whereupon said lock means allows said valve to open, said float operated valve further including inhibit means for inhibiting operation of said lock means until said valve is closed in response to said main float exerting a buoyant force on said release means which exceeds said releasable force, whereupon said lock means again locks said valve in the closed state.

* * * * *

UNITED STATES PATENT AND TRADEMARK OFFICE
CERTIFICATE OF CORRECTION

PATENT NO. : 4,655,244
DATED : April 7, 1987
INVENTOR(S) : Soo H. Park

It is certified that error appears in the above—identified patent and that said Letters Patent is hereby corrected as shown below:

In the Claims:

Claim 13, change dependency from claim 12 to claim 10.

Claim 10, line 11, as issued, the words "separate from said float arm" should be inserted after the words "release means".

Signed and Sealed this

Sixth Day of October, 1987

Attest:

DONALD J. QUIGG

*Attesting Officer*     *Commissioner of Patents and Trademarks*